US012373484B2

(12) United States Patent
Gopalkrishna et al.

(10) Patent No.: US 12,373,484 B2
(45) Date of Patent: Jul. 29, 2025

(54) MULTIMODAL SEMANTIC ANALYSIS AND IMAGE RETRIEVAL

(71) Applicant: NEC Laboratories America, Inc., Princeton, NJ (US)

(72) Inventors: Vijay Kumar Baikampady Gopalkrishna, Santa Clara, CA (US); Samuel Schulter, Long Island City, NY (US); Manmohan Chandraker, Santa Clara, CA (US); Xiang Yu, Mountain View, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/639,500

(22) Filed: Apr. 18, 2024

(65) Prior Publication Data

US 2024/0354336 A1    Oct. 24, 2024

Related U.S. Application Data

(60) Provisional application No. 63/468,283, filed on May 23, 2023, provisional application No. 63/460,952, filed on Apr. 21, 2023.

(51) Int. Cl.
*G06F 16/538* (2019.01)
*G06F 16/532* (2019.01)
(Continued)

(52) U.S. Cl.
CPC .......... *G06F 16/538* (2019.01); *G06F 16/532* (2019.01); *G06F 40/30* (2020.01);
(Continued)

(58) Field of Classification Search
CPC .................................................. G06F 16/2425
(Continued)

(56) References Cited

U.S. PATENT DOCUMENTS

| 2004/0083206 | A1* | 4/2004 | Wu | G06F 16/951 |
| 2016/0224593 | A1* | 8/2016 | Qiu | G06N 20/00 |
| 2024/0161520 | A1* | 5/2024 | Li | G06N 3/08 |

OTHER PUBLICATIONS

Zhou, K., Yang, J., Loy, C. C., & Liu, Z. (Oct. 6, 2022). Learning to prompt for vision-language models. International Journal of Computer Vision, 130(9), 2337-2348.
(Continued)

*Primary Examiner* — Baoquoc N To
(74) *Attorney, Agent, or Firm* — Joseph Kolodka

(57) ABSTRACT

Systems and methods are provided for identifying and retrieving semantically similar images from a database. Semantic analysis is performed on an input query utilizing a vision language model to identify semantic concepts associated with the input query. A preliminary set of images is retrieved from the database for semantic concepts identified. Relevant concepts are extracted for images with a tokenizer by comparing images against a predefined label space to identify relevant concepts. A ranked list of relevant concepts is generated based on occurrence frequency within the set. The preliminary set of images is refined based on selecting specific relevant concepts from the ranked list by the user by combining the input query with the specific relevant concepts. Additional semantic analysis is iteratively performed to retrieve additional sets of images semantically similar to the combined input query and selection of the specific relevant concepts until a threshold condition is met.

14 Claims, 9 Drawing Sheets

(51) Int. Cl.
    *G06F 40/30*     (2020.01)
    *G06V 10/40*     (2022.01)
    *G06V 10/74*     (2022.01)
    *G06V 10/94*     (2022.01)

(52) U.S. Cl.
    CPC ............ *G06V 10/40* (2022.01); *G06V 10/761* (2022.01); *G06V 10/945* (2022.01)

(58) Field of Classification Search
    USPC ........................................ 707/724, 749, 769
    See application file for complete search history.

(56) References Cited

OTHER PUBLICATIONS

Radford, A., Kim, J. W., Hallacy, C., Ramesh, A., Goh, G., Agarwal, S., . . . & Sutskever, I. (Jul. 18, 2021). Learning transferable visual models from natural language supervision. In International conference on machine learning (pp. 8748-8763). PMLR.

Veit, A., Belongie, S., & Karaletsos, T. (Jul. 21, 2017). Conditional similarity networks. In Proceedings of the IEEE conference on computer vision and pattern recognition (pp. 830-838).

Feng Li et al., "Vision-Language Intelligence: Tasks, Representation Learning, and Large Models", arXiv:2203.01922v1, Mar. 2022 (https://arxiv.org/pdf/2203.01922) pp. 1, 4-8; and figure 6.

* cited by examiner

MULTIMODAL SEMANTIC ANALYSIS AND IMAGE RETRIEVAL

RELATED APPLICATION INFORMATION

This application claims priority to U.S. Provisional App. No. 63/460,952, filed on Apr. 21, 2023, and U.S. Provisional App. No. 63/468,283, filed on May 23, 2023, each incorporated herein by reference in its entirety.

BACKGROUND

Technical Field

The present invention relates to systems and methods for image retrieval and semantic analysis, and more particularly to interactive, multimodal systems and methods that utilize machine learning and vision-language models for dynamic organization and semantic categorization of images for processing complex semantic queries.

Description of the Related Art

In the field of semantic search and information retrieval, conventional methodologies use keyword-based approaches for text and basic visual similarity techniques for images. These conventional systems utilize straightforward matching of text or visual patterns without any analysis or comprehension of the context, meaning, or intent behind the user queries. As a result, such methods fall short when dealing with complex, ambiguous, or multi-meaning queries. For example, a search for "Apple" could pertain to the technology company, the fruit, or even related concepts like "Apple Music" or "apple pie recipes," which conventional (e.g., keyword-based) searches cannot differentiate effectively. In image retrieval, the conventional reliance on visual similarity (e.g., assessing images based on color, texture, shape, or pattern) limits the ability to understand the deeper semantic content or thematic connections between images. This limitation becomes particularly evident in applications requiring nuanced analysis, such as identifying thematic relevance among diverse image datasets or understanding the sentiment conveyed by an image in social media analysis.

Conventional systems and methods also require extensive, accurately labeled datasets to train models for effective search and retrieval. This necessity presents significant challenges, including the need for substantial manual labor to create and maintain these datasets and the difficulty in covering the breadth of semantic nuances across different domains. Conventional approaches further rely on significant manual input for training and fine-tuning. The limitations of these conventional systems underscore the need for more advanced, intuitive, and context-aware semantic search technologies capable of bridging the gap between simple keyword or visual pattern matching and the rich, nuanced understanding required for today's diverse and dynamic data landscapes.

SUMMARY

According to an aspect of the present invention, a method is provided for identifying and retrieving semantically similar images from a database, including performing a semantic analysis on an input query utilizing a trained vision language (VL) model to identify semantic concepts associated with the input query, retrieving a preliminary set of images from the database based on the semantic concepts identified, the database including images annotated with semantic information, and extracting, for each image in the preliminary set of images, relevant concepts using a tokenizer, the tokenizer comparing each image against a predefined label space to identify the relevant concepts. A ranked list of the relevant concepts is generated and presented to a user based on occurrence frequency within the preliminary set of images. The preliminary set of images is refined based on a selection of specific relevant concepts from the ranked list of the relevant concepts by the user by combining the input query with the selection of the specific relevant concepts, and additional semantic analysis is iteratively performed to retrieve additional sets of images semantically similar to the combined input query and the selection of the specific relevant concepts until a threshold condition is met.

According to another aspect of the present invention, a system is provided for identifying and retrieving semantically similar images from a database, including a processor, and a memory storing instructions that, when executed by the processor, cause the system to perform a semantic analysis on an input query using a trained vision language (VL) model to identify semantic concepts associated with the input query, retrieve a preliminary set of images from the database based on the identified semantic concepts, with the database including images annotated with semantic information. Relevant concepts are extracted for each image in the preliminary set using a tokenizer that compares each image against a predefined label space, and a ranked list of the relevant concepts is generated and presented to the user based on occurrence frequency within the preliminary set of images. The preliminary set of images is refined based on a selection of specific relevant concepts from the ranked list by the user by combining the input query with the selection, and additional semantic analysis is iteratively performed to retrieve additional sets of images semantically similar to the combined input query and the selection of the specific relevant concepts until a threshold condition is met.

According to another aspect of the present invention, a computer program product is provided for identifying and retrieving semantically similar images from a database, the computer program product including a computer readable storage medium having program instructions embodied therewith, the program instructions executable by a hardware processor to cause the hardware processor to perform a semantic analysis on an input query using a trained vision language (VL) model to identify semantic concepts associated with the input query, retrieve a preliminary set of images from the database based on the identified semantic concepts, with the database including images annotated with semantic information, and extract relevant concepts for each image in the preliminary set using a tokenizer that compares each image against a predefined label space. A ranked list of the relevant concepts is generated and presented to a user based on occurrence frequency within the preliminary set of images. The preliminary set of images is refined based on a selection of specific relevant concepts from the ranked list by the user by combining the input query with the selection, and additional semantic analysis is iteratively performed to retrieve additional sets of images semantically similar to the combined input query and the selection of the specific relevant concepts until a threshold condition is met.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
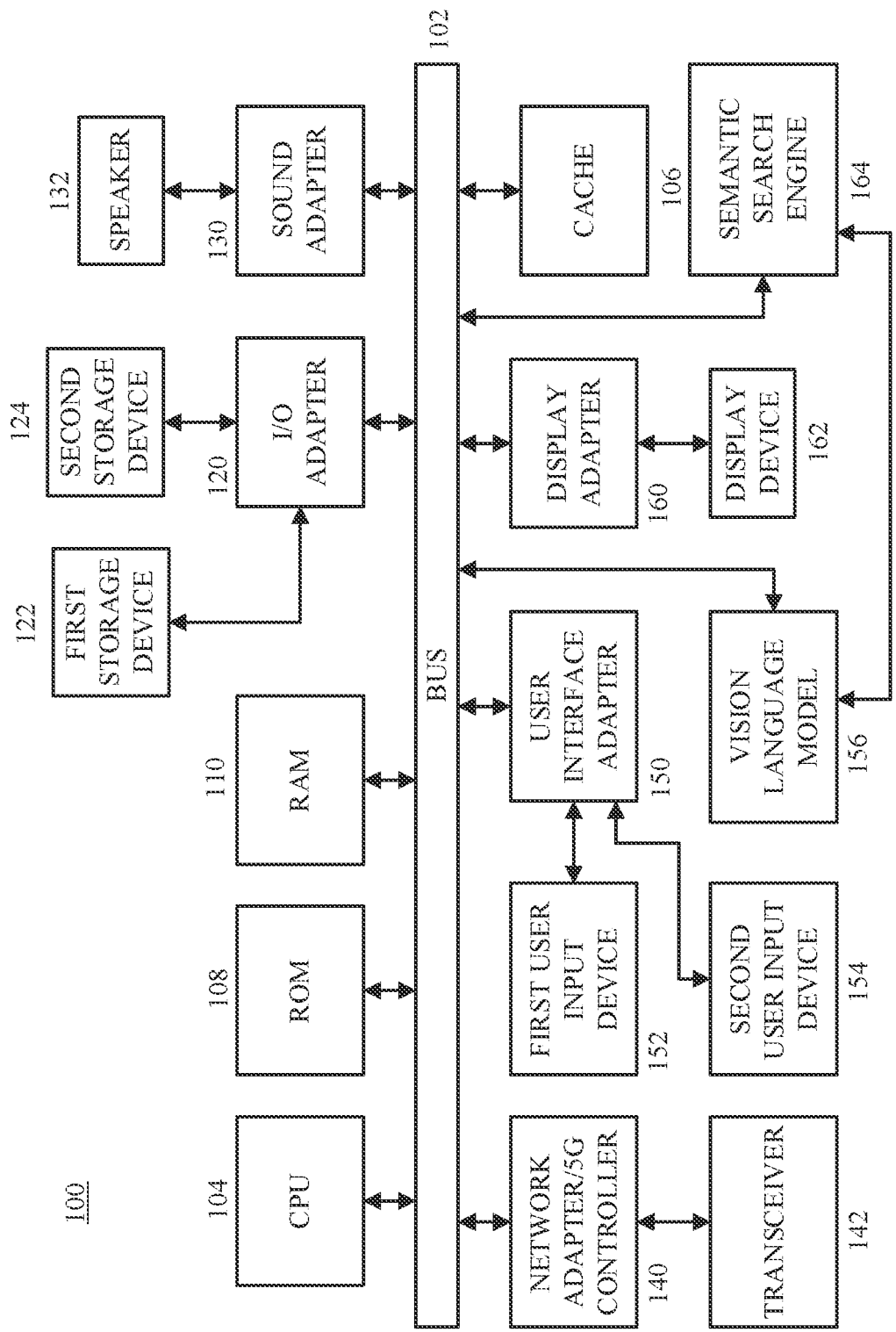
FIG. 1 is a block diagram illustratively depicting an exemplary processing system to which the present invention may be applied, in accordance with embodiments of the present invention.

In accordance with embodiments of the present invention, systems and methods are provided for multimodal semantic analysis and image retrieval System which efficiently and accurately retrieves and semantically analyzes images using advanced vision-language models responsive to user queries (e.g., textual, image, video, etc.). The system and method can receive as input a combination of, for example, visual and textual data to interpret and identify the nuanced meanings behind various image queries. At its core, the invention can integrate a sophisticated neural network that is meticulously trained on a diverse set of image-text pairs, enabling it to extract complex semantic concepts from visual inputs. The system's capability extends beyond conventional retrieval methods, as it not only recognizes visual patterns but also understands the broader context and associations related to the images. Through an interactive interface, users can refine their search results by selecting relevant concepts from a ranked list, iteratively guiding the system towards more accurate and contextually rich image sets.

In some embodiments, the invention can incorporate a feedback loop where domain experts can impart their knowledge, further fine-tuning the AI model's ability to discern and categorize images accurately. The feedback mechanism ensures that the system continuously evolves and adapts, enhancing its semantic understanding over time. Alongside, a robust computational network supports the demanding tasks of data processing and image retrieval, maintaining the system's efficiency. The system can include a plurality of system components, including, for example, a camera for image acquisition, an image retrieval device, user and server interfaces, and a unified framework that simplifies complex semantic searches using Artificial Intelligence (AI)-based multimodal semantic analysis and image retrieval techniques. The system is adept at managing a comprehensive image database and can utilize a tokenizer to break down textual information into semantic units, effectively bridging the gap between raw data and meaningful content, in accordance with aspects of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems, and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods, and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. A Vision Language (VL) model can be utilized in conjunction with a semantic search engine 164 for text and/or image processing tasks, and can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. The VL model 156 can be included in a system with one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154 are used to input and output information to and from system 100, in accordance with aspects of the present invention. A VL model 156 can process received input, and a semantic search engine 164 can be operatively connected to the system 100 for semantic searching and image retrieval tasks, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200, 300, 400, 500, and 900, described below with respect to FIGS. 2, 3, 4, 5, and 9, respectively, are systems for implementing respective embodiments of the present invention. Part or all of processing system 100 may be implemented in one or more of the elements of systems 200, 300, 400, 500, and 900, in accordance with aspects of the present invention.

Further, it is to be appreciated that processing system 100 may perform at least part of the methods described herein including, for example, at least part of methods 200, 300, 400, 500, 600, 700, and 800, described below with respect to FIGS. 2, 3, 4, 5, 6, 7, and 8, respectively. Similarly, part or all of systems 200, 300, 400, 500, and 900 may be used to perform at least part of methods 200, 300, 400, 500, 600, 700, and 800 of FIGS. 2, 3, 4, 5, 6, 7, and 8, respectively, in accordance with aspects of the present invention.

As employed herein, the term "hardware processor subsystem," "processor," or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs). These and other variations of a hardware processor subsystem are also contemplated in accordance with embodiments of the present invention.

Figure 2:
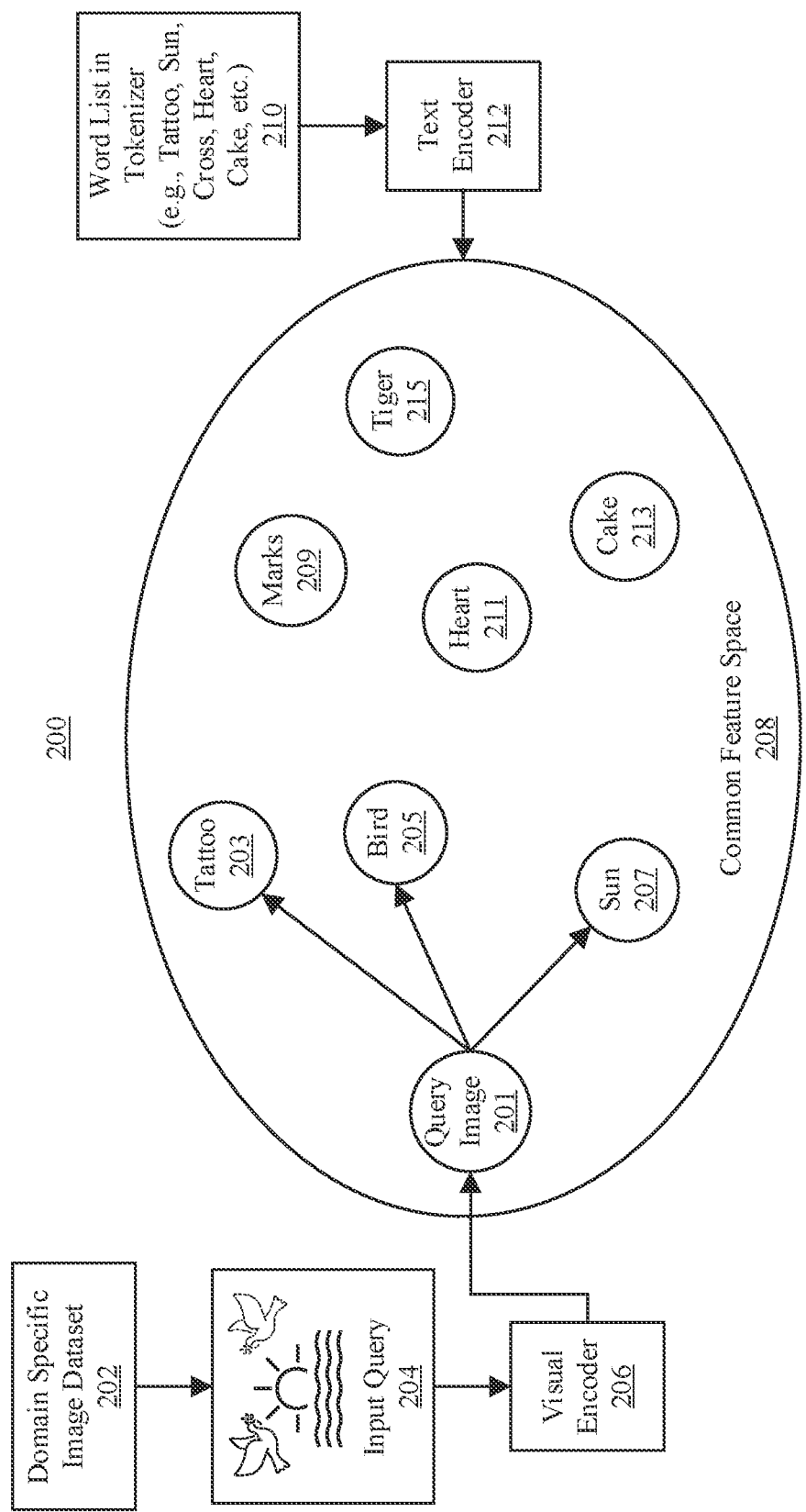
FIG. 2 is a diagram illustratively depicting a high-level view of an exemplary system and method for Artificial Intelligence (AI)-based multimodal semantic analysis and image retrieval responsive to diverse input queries, in accordance with embodiments of the present invention.

Referring now to FIG. 2, a high-level view of an exemplary system and method 200 for Artificial Intelligence (AI)-based multimodal semantic analysis and image retrieval responsive to diverse input queries, is illustratively depicted in accordance with embodiments of the present invention.

In various embodiments, in block 202, a domain-specific image dataset, which may encompass a wide array of image types, such as tattoos, faces, or automobiles, is employed. This dataset is meticulously curated, with images annotated with semantic tags and descriptors. Such a dataset is instrumental for the search system, providing a reference repository from which semantic comparisons can be drawn. The images within this dataset have been preprocessed to ensure that features are extractable and that each image is associated with metadata that conveys its semantic content. The repository thus facilitates a rich database against which input queries can be semantically matched.

Block 204 describes the reception of the input query. This is the juncture where the system interfaces with users, accepting image submissions for semantic analysis. The preprocessing of these images involves normalization, resolution adjustment, and possibly feature enhancement to optimize them for encoding. This preprocessing step is crucial to remove noise and standardize the input, enabling more effective feature extraction and ensuring consistency across the semantic search process. In block 206, the visual encoder functions as a transformative mechanism that converts the visual data from the input query into a numerical feature vector. Employing convolutional neural networks or similar advanced machine learning architectures, the visual encoder distills the essence of the visual input into a form that encapsulates its most significant visual attributes, such as shapes, textures, and patterns. The output is a succinct yet comprehensive representation of the image's visual information, poised for semantic comparison.

In various embodiments, the output from block 206 is fed into block 201, where the vectorized query image resides within the common feature space. This space is an abstract construct where semantic similarity transcends the modality of origin-whether textual or visual. Here, the feature vector of the query image is ready to be matched against other vectors representing the semantic content of images and words in the database, facilitating a modality-agnostic comparison. Block 208, the common feature space, is depicted as the melting pot of multimodal data, where each vector, regardless of originating from visual or textual analysis, is compared. This comparison is based on semantic proximity; vectors that are close within this space are considered semantically similar. This semantic matchmaking is at the heart of the system, allowing it to discern context and nuanced meanings.

In block 210, the tokenizer can break down textual information into constituent elements (e.g., words or tokens that the system can process). The word list within the tokenizer includes semantically potent terms that may be relevant to the domain of the search. These tokens can be utilized for the semantic analysis of text, serving as the bridge between raw text data and semantically enriched vectors that can participate in the common feature space. Block 212 showcases the text encoder, where textual tokens are transformed into text-based feature vectors. This encoder utilizes natural language processing to interpret and encode the semantic significance of the tokens, aligning them with the system's understanding of semantics as established within the common feature space.

In various embodiments, blocks 203, 205, 207, 209, 211, 213, and 215 can be utilized for concept identification and association. These blocks represent individual concepts identified by the system and are the outcome of the search process. Each concept is a node within the common feature space linked to the query image, denoting semantic relevance. The concept nodes, ranging from 'Tattoo" to 'Tiger" in this illustrative example, are not just standalone points; they are interconnected nodes that comprise the semantically rich network which the system uses to understand the query in a broader semantic context. This above-described process, from the initial reception of an image query to the semantic linking of concepts within a multimodal framework, represents an innovative leap in speed, accuracy, and reduction in processor requirements for searching technology, in accordance with aspects of the present invention.

Figure 3:
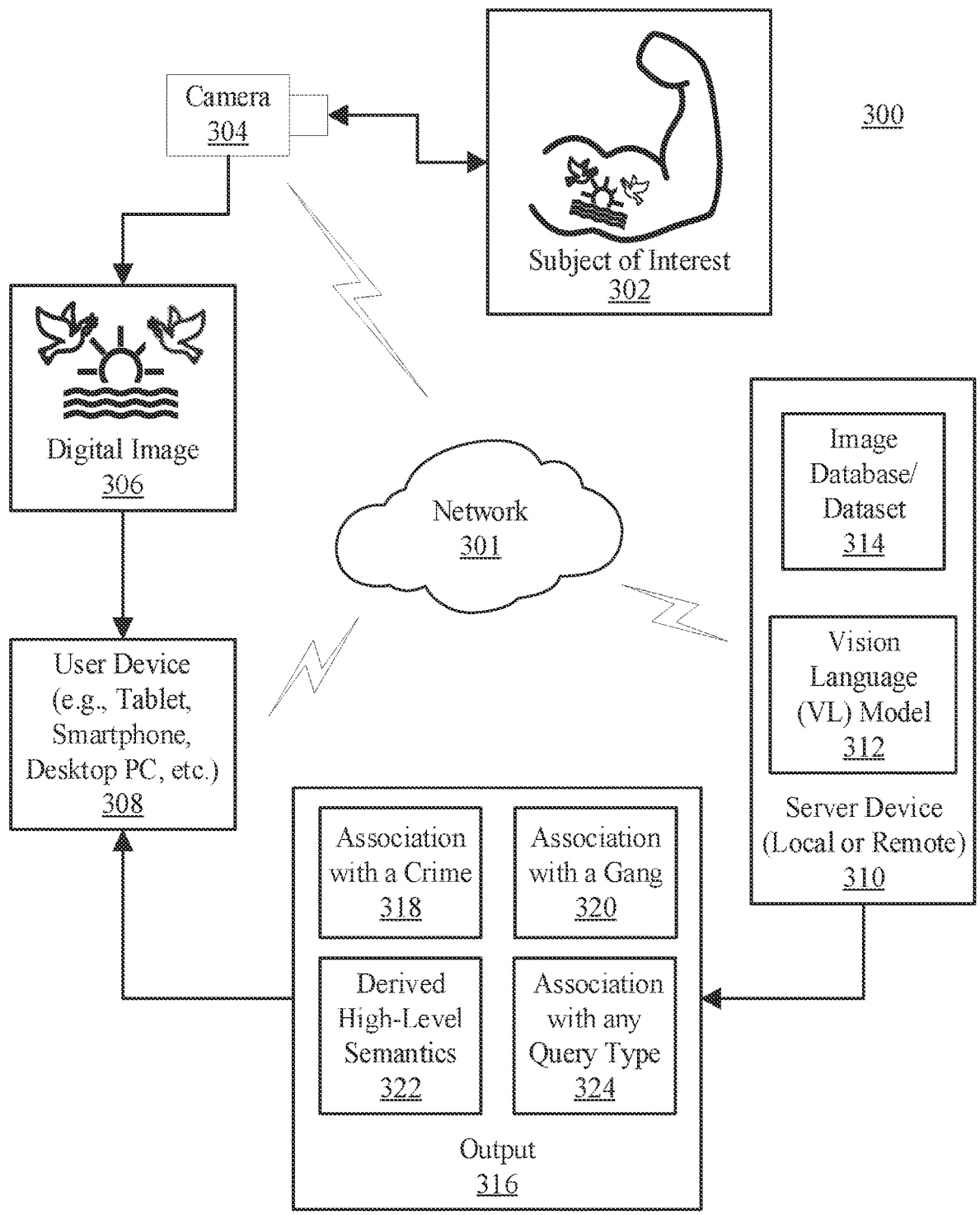
FIG. 3 is a diagram illustratively depicting a system and method for domain-specific Artificial Intelligence (AI)-based multimodal semantic analysis and image retrieval responsive to diverse input queries, in accordance with embodiments of the present invention.

Referring now to FIG. 3, a diagram showing a system and method 300 for domain-specific Artificial Intelligence (AI)-based multimodal semantic analysis and image retrieval responsive to diverse input queries, is illustratively depicted in accordance with embodiments of the present invention.

In various embodiments, the system and method 300 describes a robust solution for the analysis and retrieval of tattoo images. This system integrates various components from image capture to semantic output, enabling domain experts to derive actionable insights from complex visual data. The system's integration with state-of-the-art vision-language models facilitates a novel approach to interpret tattoos that traditional visual similarity algorithms cannot decipher, noting that although tattoo identification will be discussed hereinbelow, any sort of images can be analyzed and interpreted in accordance with aspects of the present invention. In this exemplary illustrative embodiment, a subject of interest, shown in block 302, represents a tattoo whose imagery the user wishes to analyze for semantic content. The subject may carry symbols or elements that require sophisticated interpretation, such as determining affiliations or meanings often associated with specific groups or activities. Block 304 features a camera or imaging device, which may range from high-resolution DSLRs to integrated smartphone cameras, used to capture a high-fidelity digital image of the subject of interest. The imaging device is calibrated to capture the nuanced details of the tattoo, ensuring that the visual data is accurately represented for subsequent semantic analysis.

Once acquired, the image can undergo digital processing in block 306. This step can include resolution adjustments, contrast enhancements, applying filters to accentuate defining features of the tattoo, etc. These preprocessing tasks can be utilized for ensuring that the digital representation of the image retains important visual cues for performing accurate semantic analysis. Block 308 symbolizes the interface through which the user interacts with the system, possibly a dedicated application on a tablet or smartphone, or a web portal on a desktop computer. Through this interface, the user submits the digital image, possibly accompanied by additional contextual information or specific questions they wish to address through the semantic search process. The interface can further include a drag-and-drop interface feature to enable users to combine multiple concepts (in random or specified order) for further refinement.

A server device 310 can act as a central processing hub of the system. It can be equipped with the necessary computational resources to support the execution of the vision-language model and manage the database interactions. The server can be configured to handle multiple concurrent user requests and perform real-time processing to meet the demands of time-sensitive forensic investigations. In block 312, the heart of the semantic analysis is the VL model. This advanced model utilizes deep neural networks to perform cross-modal analysis, enabling it to understand the contextual and symbolic meanings of visual data. The model can be trained on diverse datasets, enabling it to generalize and accurately interpret a wide array of visual concepts, in accordance with aspects of the present invention. Block 314 refers to a comprehensive database or dataset that contains a plethora of images annotated with detailed semantic information. The repository can be dynamic, continually updated with new data and annotations to ensure the system's outputs are based on the latest available information. This resource can be utilized for maintaining the system's high speed, accuracy, and relevance in semantic associations.

In various embodiments, outputs 316, represent a final product delivered to user after the processing and analysis of the digital image. These outputs can include semantic associations that the system has determined to be relevant to the image query. They can be presented in a clear, user-friendly format, separate from, or within the same interface used for query submission. In blocks 318, 320, 322, and 324, detailed semantic association outputs can be determined and provided to users. These blocks show representative specific types of semantic associations and outputs that the system can discern and present. Block 318 outlines the system's capacity to associate the subject of interest with a crime in real-time, thus aiding in criminal investigations or profiling. Block 320 highlights the system's ability to link imagery to known gangs or subcultures, providing law enforcement with useful investigative insights. Block 322 involves the derivation of high-level semantics, where the system can extrapolate beyond the visible elements to understand the broader implications and contexts of the imagery (e.g., tattoo imagery). Block 324 encompasses the system's proficiency in associating the imagery with any query type submitted by the user, underscoring the system's adaptability and user-centric design, in accordance with aspects of the present invention.

Figure 4:
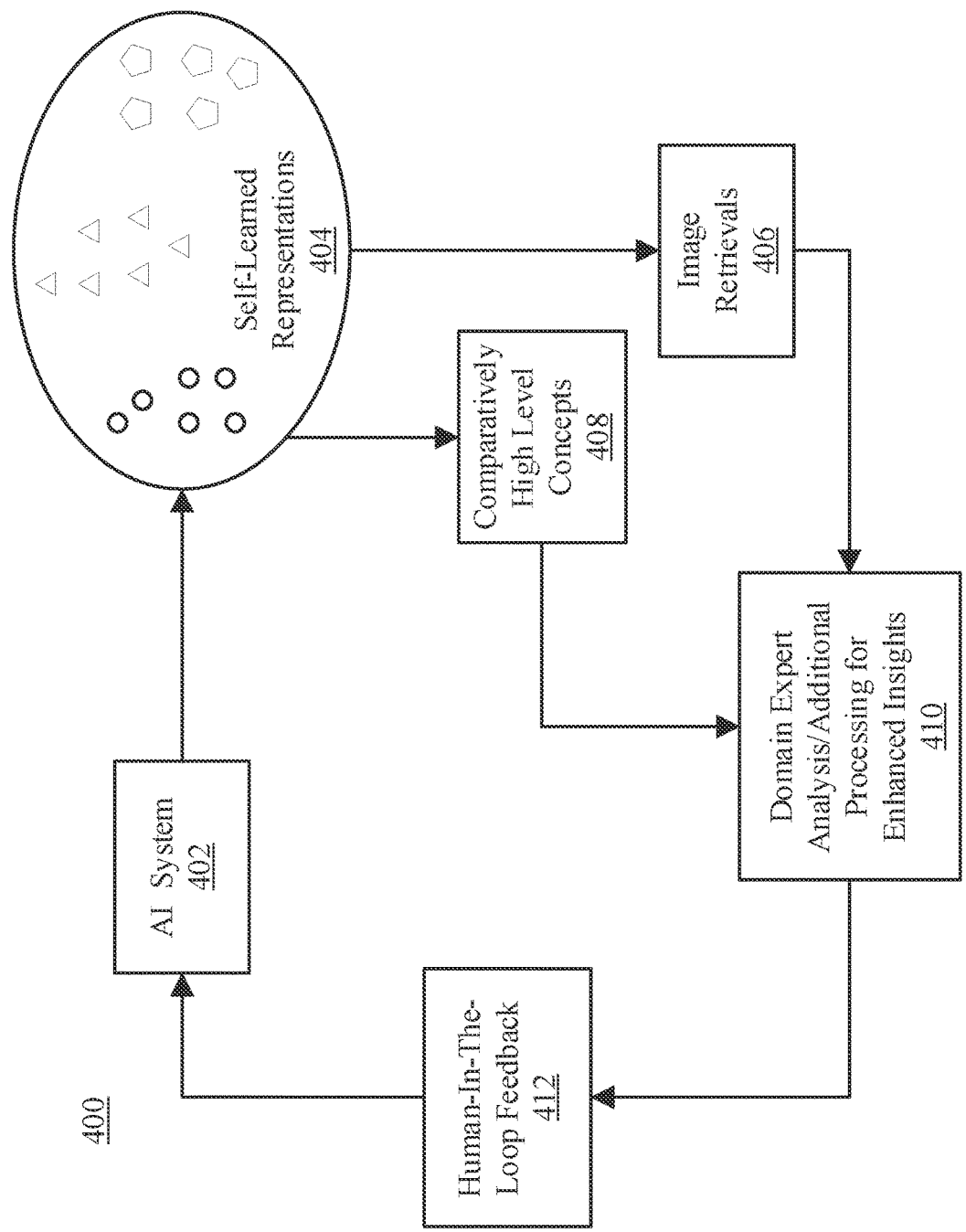
FIG. 4 is a diagram illustratively depicting a system and method for iterative enhancement of Artificial Intelligence (AI)-based multimodal semantic analysis and image retrieval based on human-in-the-loop expert feedback, in accordance with embodiments of the present invention.

Referring now to FIG. 4, a diagram showing a system and method 400 for iterative enhancement of Artificial Intelligence (AI)-based multimodal semantic analysis and image retrieval based on human-in-the-loop expert feedback, is illustratively depicted in accordance with embodiments of the present invention.

In various embodiments, the system and method 400 is a depiction of a sophisticated, adaptive AI system designed to perform semantic analysis and retrieval of images. The system is unique in its incorporation of domain-specific feedback, enabling continuous learning and enhancement of its semantic analysis capabilities. The detailed depiction of the feedback loop and the inclusion of human expertise underscore the inventive step of marrying machine learning with domain-specific knowledge, advancing beyond the capabilities of conventional image retrieval systems, in accordance with aspects of the present invention.

In various embodiments, in block 402, the core AI system is depicted as the primary processor of image data and semantic interpretation. It is responsible for initial analysis, applying machine learning and deep learning techniques to extract and understand the visual content of images submitted as queries. The AI system incorporates sophisticated algorithms capable of identifying complex patterns and learning from vast datasets to form an initial hypothesis about the semantic content of each image. Block 404 represents the AI system's capability to develop self-learned representations. These representations can be complex multi-dimensional vectors or feature maps that the system has autonomously constructed from the input data, with no explicit external labeling. They can be the result of the AI's unsupervised learning, where it can identify and codify inherent structures and patterns within the data, forming a foundation for subsequent semantic interpretation.

Block 406 illustrates the AI system's application of enhanced semantic analysis for targeted image retrievals. Based on the improved high-level concepts and the insights provided by the domain expert, the system can retrieve a new set of images that better align with the refined semantic criteria. These retrievals can then be presented back to the domain expert for further analysis, continuing the cycle of feedback and refinement. In block 408, the AI system can extrapolate comparatively higher-level concepts from the self-learned representations. These concepts can be abstractions and generalizations that the system identifies as semantically significant and potentially meaningful to domain experts. This step can involve the AI's ability to reason beyond individual data points, drawing on its learned knowledge to categorize and conceptualize the visual data into broader themes or ideas.

Block 410 describes a role of the domain expert in the retrieval process. In this illustrative embodiment, an expert can scrutinize the AI-generated concepts, applying their specialized knowledge and contextual understanding to evaluate and refine the AI's output. The domain expert's analysis may include the identification of nuances or subtleties that the AI's algorithmic approach might overlook, thereby enhancing the insights derived from the system. The human-in-the-loop feedback mechanism, shown in block 412, can represent an iterative component of the system. It can include the dynamic interchange between the domain expert and the AI system (e.g., human-in-the-loop), where feedback from the expert's analysis can be used to inform and refine the AI's learning process. This feedback loop enables the system to evolve its understanding and improve its semantic representations and high-level concept identification over time, tailoring its learning to the expert's requirements, in accordance with aspects of the present invention.

Figure 5:
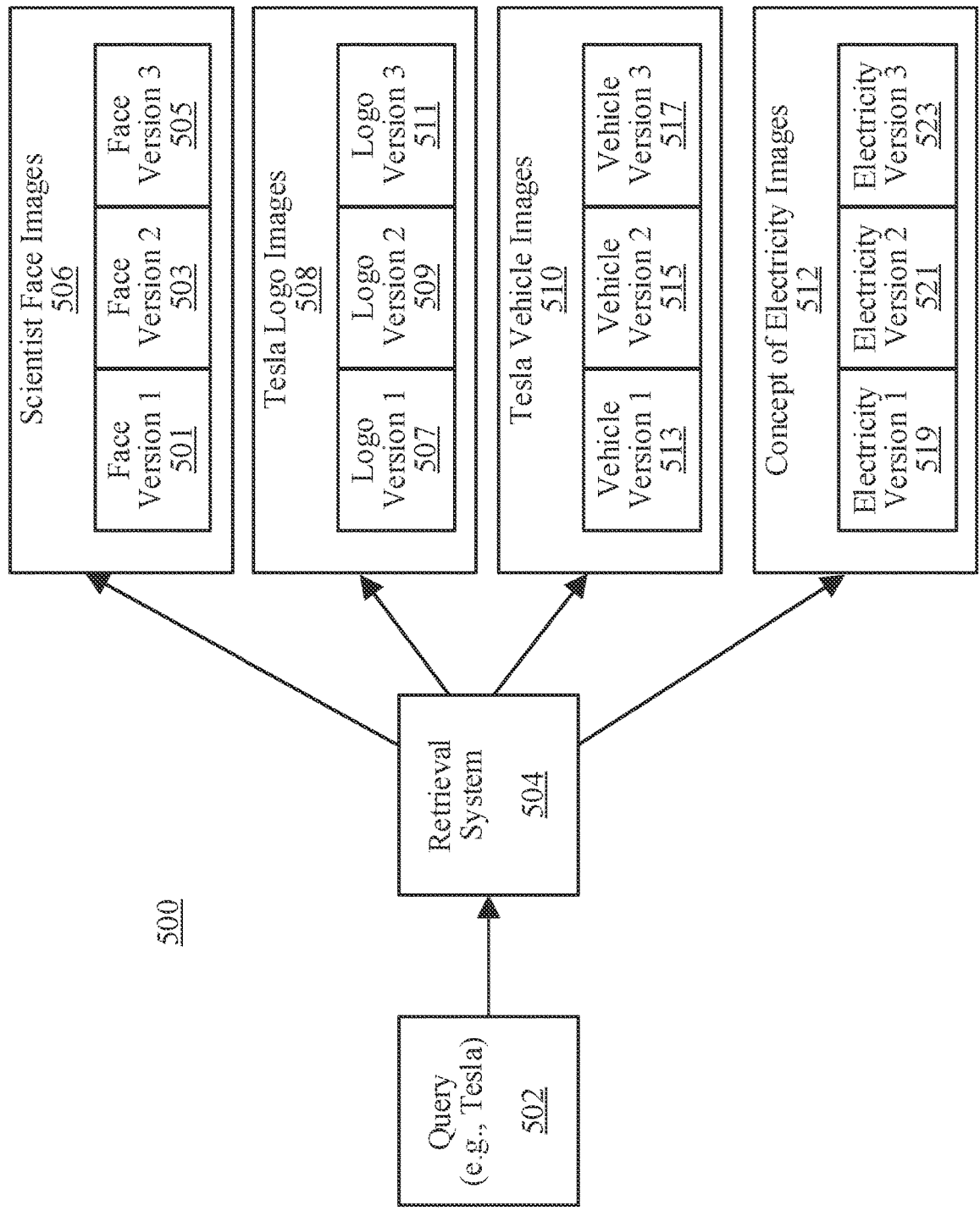
FIG. 5 is a diagram illustratively depicting a system and method for advanced semantic query interpretation and image retrieval using Artificial Intelligence (AI)-based multimodal semantic analysis and image retrieval, in accordance with embodiments of the present invention.

Referring now to FIG. 5, a diagram showing a system and method 500 for advanced semantic query interpretation and image retrieval using Artificial Intelligence (AI)-based multimodal semantic analysis and image retrieval, is illustratively depicted in accordance with embodiments of the present invention.

In various embodiments, in block 502, a retrieval process can be initiated by the user entering a textual query, such as "Tesla," into the query initiation interface. This interface is designed to accommodate queries with broad semantic landscapes and is sophisticated enough to understand that a term may reference multiple entities or concepts, such as a renowned historical figure, a contemporary technological enterprise, or an overarching scientific principle. It is to be appreciated that although "Tesla" is described as the query for illustrative purposes, any query can be entered and analyzed, in accordance with aspects of the present invention. In block 504, an intelligent retrieval system core can be utilized, and can be an advanced AI mechanism which processes a textual query, employing state-of-the-art semantic analysis to map the input to potential visual representations. The AI can draw from a vast database of tagged images, leveraging deep learning to associate the text with accurate visual depictions across varied categories.

The AI system in block 506 can aggregate a set of images around the theme of 'Scientist,' particularly those related to the scientist Nikola Tesla. This demonstrates the AI's nuanced ability to extract the historical and academic significance from the query, aligning the search results with images that embody the legacy of Tesla the scientist. Block 501 is an exemplar of targeted image retrieval, presenting the first variation of Nikola Tesla's face. This image is one of the multiple renditions the AI system has identified and retrieved, illustrating the variety within the semantic context of historical figures that the query may represent. In block 503, the system provides a second variation of Nikola Tesla's face. Each version selected by the AI is distinct, reflecting the system's diverse archival access and its capacity to distinguish between and within image categories to provide a comprehensive visual array. Block 505 depicts a third variation of Nikola Tesla's face. By presenting multiple instances of related imagery, the system caters to users who may be searching for a specific portrayal or who desire a breadth of options for comparative or analytical purposes.

In block 508, the AI has consolidated a category dedicated to the Tesla company logo, differentiating these from the other image categories. This separation can be utilized for facilitating users in swiftly locating brand-related imagery distinct from Tesla's personal or conceptual associations. Block 507 unveils the first variant of the Tesla logo image. The retrieval system utilizes visual recognition technologies to differentiate and retrieve various designs and iterations of the Tesla brand logo, recognizing its significance to users investigating corporate identity or marketing evolution. Block 509 continues with a second variant of the Tesla logo image, further illustrating the AI system's capability in diversifying its retrieval to present users with an array of logo options, each potentially reflecting different eras or design changes.

Block 511 showcases a third variant of the Tesla logo image, adding to the spectrum of the brand's visual identities made accessible by the system. This exemplifies the AI's retrieval prowess and its sensitivity to visual nuances within brand imagery. The AI's sophistication is on display in block 510, where it can select a series of images related to Tesla vehicles, marking a distinct category that appeals to users with an interest in automotive design, technology, and evolution. This category reflects the system's discerning eye for product-specific imagery. In block 513, the first variant of a Tesla vehicle is retrieved. This could represent a specific model or type, illustrating the AI system's detailed recognition capabilities that cater to nuances in automotive design indicative of the Tesla brand. Block 515 demonstrates the system retrieving a second variant of a Tesla vehicle, emphasizing the system's ability to offer a variety of images within the same product category, allowing users to explore different models and designs of Tesla vehicles. Block 517 presents a third variant of a Tesla vehicle, completing the trio of vehicle images provided. This diversity supports users in drawing comparisons, conducting analyses, or simply admiring the range of vehicle designs offered by Tesla.

Block 512 delineates the AI's intellectual leap in connecting the query to the broad concept of electricity, presenting a set of images that encapsulate the essence of electrical innovation. This could include photographs of electrical inventions, symbols, or conceptual artwork, all linked to the theme of electricity that Tesla's work embodies. The retrieval system in block 519 delivers the first variant of an image related to the concept of electricity, which might be a literal depiction or an abstract illustration. This demonstrates the AI system's expansive semantic understanding and its ability to interpret and retrieve images based on abstract concepts. In block 521, a second image variant representing the concept of electricity is retrieved, providing a different visual perspective on the theme. This variant showcases the system's depth and breadth in curating images that, while thematically connected, offer varied representations of the same concept. Block 523 completes this exemplary, illustrative retrieval set with a third image variant related to the concept of electricity, solidifying the system's capacity to present a rich tapestry of conceptual imagery. This range allows users to appreciate the multiple visual interpretations and the profound connections between Tesla and the field of electrical science, in accordance with aspects of the present invention.

Figure 6:
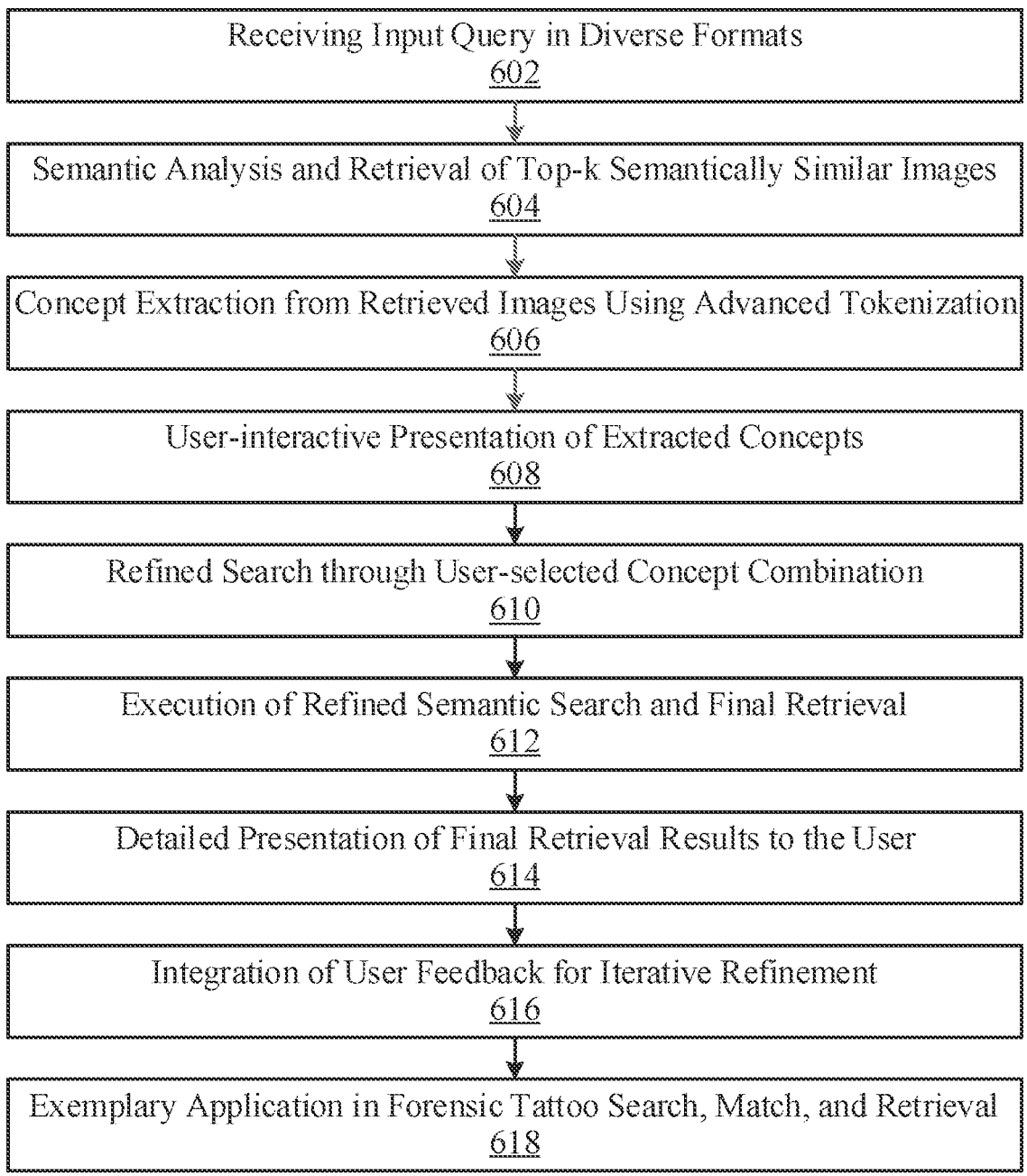
FIG. 6 is a diagram illustratively depicting a method for domain-specific Artificial Intelligence (AI)-based multimodal semantic analysis and image retrieval responsive to diverse input queries, in accordance with embodiments of the present invention.

Referring now to FIG. 6, a diagram showing a method 600 for domain-specific Artificial Intelligence (AI)-based multi-modal semantic analysis and image retrieval responsive to diverse input queries, is illustratively depicted in accordance with embodiments of the present invention.

In various embodiments, in block 602, a multimodal semantic search system begins by receiving an input query, which can be any type of medie (e.g., text, video, image, etc). The system can handle complex queries that may have ambiguous meanings or require deep domain-specific understanding. The input can be then subjected to preprocessing to improve the clarity of text and image quality for subsequent analysis. This step can involve preprocessing the query to understand its format and prepare for the subsequent semantic and conceptual analysis. The system ensures that queries encompassing a wide range of subjects, from specific objects to abstract concepts, are accurately interpreted for further processing.

In block 604, semantic analysis and retrieval of top-k semantically similar images can be performed by leveraging advanced vision-language (VL) models, and can include semantic analysis of an input query to identify and retrieve the top-k semantically similar images. The models, trained on extensive image-text pairs, can utilize their multi-modal capabilities to understand the nuanced meanings behind the query, far surpassing traditional keyword-based or visual similarity-based searches. This process can be utilized for bridging the gap between visual concepts and textual semantics, enabling a more refined search that acknowledges the intent and context of the query. In block 606, upon retrieving the top-k images, the system can apply a sophisticated tokenization process to extract relevant concepts from each image. This can involve a detailed comparison of images against a comprehensive label space, which may be pre-defined by the user or default to the model's tokenizer. The extraction process can include a refinement phase to eliminate redundant or overlapping concepts and/or non-discriminative labels, ensuring that only distinct and relevant concepts are considered. The outcome can be a rich set of semantically significant concepts for each image, providing a foundation for the nuanced understanding and classification of the content, in accordance with aspects of the present invention.

In block 608, user-interactive presentation of extracted concepts can include presenting the extracted concepts to the user in an interactive and user-friendly manner. The system can rank these concepts based on their occurrence frequency across the retrieved images and displays them in a way that facilitates easy, user-friendly review and selection by the user. This interactive presentation not only can enhance user engagement but also can empower users to refine their search with a deep understanding of the semantic landscape surrounding their initial query. In block 610, building on the user's selection of relevant concepts, this step focuses on refining the search by combining the original query with the chosen concepts. This combination process can be tailored to the format of the initial query, employing sophisticated algorithms to merge textual and visual information in a manner that respects the semantic integrity of the user's intent. The refined query formulation highlights the flexibility of the present invention and its capability to adapt search strategies based on user input, ensuring a search output that is closely aligned with the user's needs.

In block 612, the refined query, now enriched with user-selected concepts, can undergo an additional semantic search process for providing a more refined semantic search. This can involve a complex interplay of the system's vision and language processing components to find matches that closely align with the refined query's semantic parameters. This retrieval step can be executed with precision, utilizing the system's comprehensive understanding of both textual and visual semantics to produce results that are not only visually similar but also conceptually aligned with the user's refined query. In block 614, the latest retrieval results can be presented to a user via a user interface, showcasing a curated selection of images or text that closely match the refined query parameters. This presentation is designed to be both informative and easy to navigate, allowing users to quickly identify results that meet their search criteria. The detailed presentation can include metadata and conceptual tags for each result, providing users with insights into the semantic reasoning behind each match.

In block 616, user feedback can be iteratively integrated for continuous refinement of search results. This feedback loop can enable users to provide direct input on the relevance and accuracy of the search results, which the system can utilize to further fine-tune its semantic analysis and retrieval processes. By incorporating user feedback, the system can learn and evolve to better understand user intent and preferences, leading to progressively more accurate and relevant search outcomes over time. In block 618, an exemplary application of the present invention for forensic analysis, which in the described illustrative example, can be utilized for tattoo search, match, and retrieval. The system's ability to interpret the meaning behind tattoos and associate them with specific entities, such as gangs or crimes, demonstrates its utility in real-world applications and its value in aiding law enforcement and domain experts, in accordance with aspects of the present invention.

Figure 7:
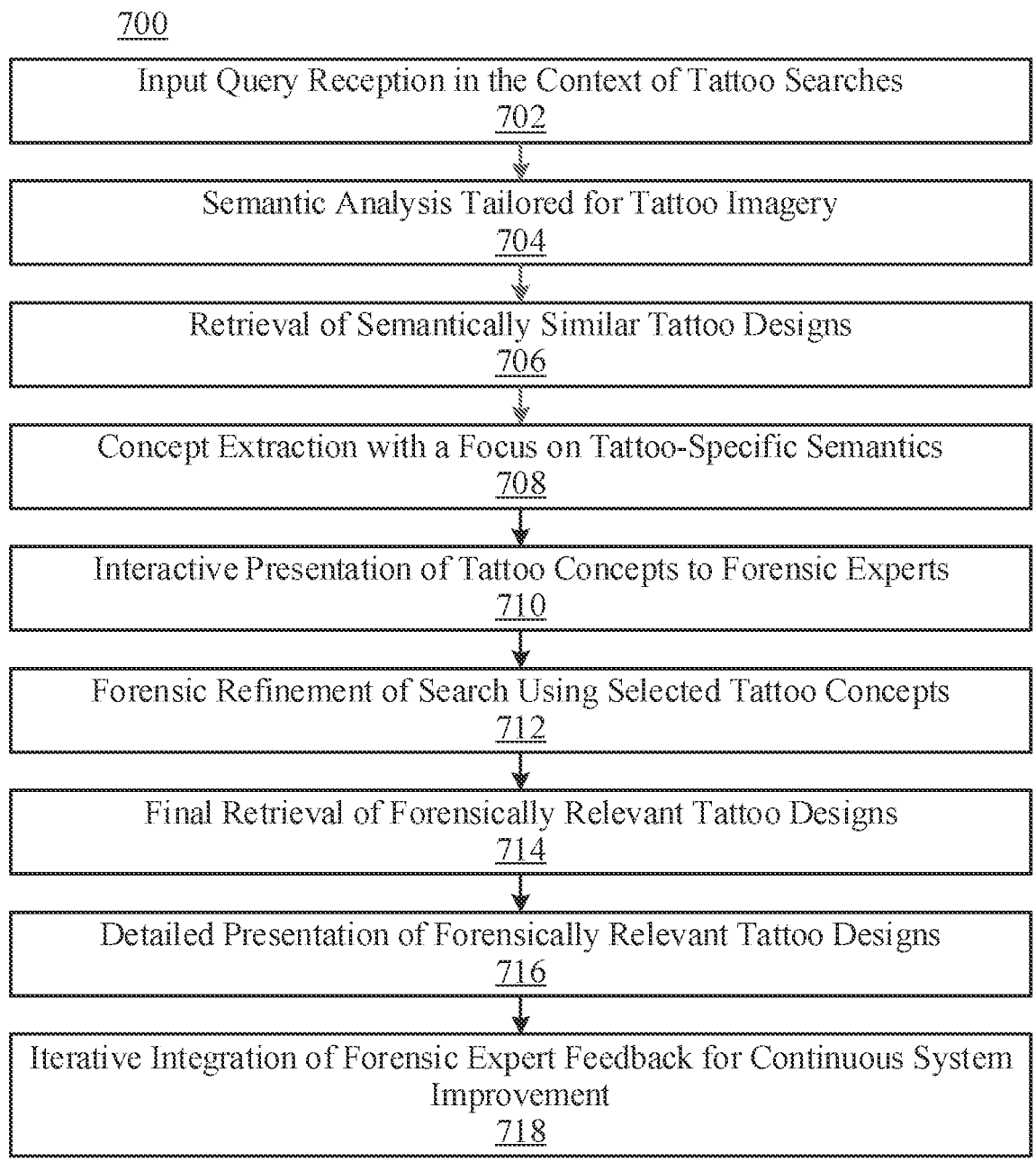
FIG. 7 is a diagram illustratively depicting a method for Artificial Intelligence (AI)-based multimodal semantic analysis and image retrieval responsive to diverse input queries for tattoo identification and image retrieval, in accordance with embodiments of the present invention.

Referring now to FIG. 7, a diagram showing a method 700 for automated, Artificial Intelligence (AI)-based multimodal semantic analysis and image retrieval responsive to diverse input queries for tattoo identification and image retrieval in real-time, is illustratively depicted in accordance with embodiments of the present invention.

In various embodiments, in block 702, input queries can be received, noting that although in the below exemplary embodiment, images specifically related to tattoo imagery will be described for ease of illustration, the present invention can be applied to any sort of query for any subject type, in accordance with aspects of the present invention. Input queries can be, for example, one or both of textual descriptions (e.g., "dragon" or "tribal") and visual inputs (e.g., images of tattoos). This step can include preprocessing to discern the nature of the query, focusing on unique aspects relevant to tattoo imagery and symbolism, thereby setting the stage for targeted semantic analysis.

In block 704, utilizing a vision-language model trained with a focus on tattoo designs and their associated meanings, this step can include conducting a deep semantic analysis of the input query, recognizing the nuanced representations and cultural significances of tattoos, going beyond basic visual characteristics to grasp the symbolic and often personal meanings embedded within tattoo art. In block 706, a curated list of tattoo designs that are semantically similar to the input query can be retrieved. This retrieval can be based on a comprehensive database of tattoo images, annotated with rich semantic information that includes cultural, symbolic, and aesthetic dimensions. The model's ability to interpret the multifaceted meanings behind tattoos can be performed in this step, ensuring that the retrieval aligns with the user's intent. In block 708, for each retrieved tattoo design, the system can extract relevant concepts using an advanced tokenization process that is specifically tuned for tattoo-related content. This can involve, for example, analyzing the designs against a specialized label space that encompasses a wide array of tattoo styles, symbols, and their meanings. The process can be refined to filter out irrelevant concepts, highlighting those that are central to understanding each tattoo's significance, in accordance with aspects of the present invention.

In various embodiments, in block 710, extracted concepts can be presented to forensic experts in an interactive manner, enabling them to review and select concepts that are deemed most relevant to their forensic inquiry. This step can facilitate the expert's engagement with the semantic layers of the tattoos, assisting in the refinement of the search based on deeper insights into the tattoos' meanings and associations. In block 712, leveraging the forensic expert's selection of relevant tattoo concepts, the system can refine the search to focus more closely on tattoos that match the forensic criteria. This refinement process can incorporate the expert's domain knowledge and the selected concepts to adjust the search parameters, ensuring that the resulting tattoo designs are of specific interest to particular forensic investigations. In block 714, the refined search can produce as output an accurate retrieval of tattoo designs that are not only semantically similar to the original query but also meet the forensic criteria specified through the refinement process. This step can identify a targeted selection of tattoo designs, each accompanied by detailed semantic annotations that explain their relevance and significance within the forensic context.

In block 716, the refined retrieval results can be presented to forensic experts, showcasing tattoo designs that have been identified as potentially significant to their investigation. This presentation can be rich in detail, offering insights into each design's cultural, symbolic, and aesthetic meanings, and providing a comprehensive overview that supports forensic analysis. In block 718, forensic expert feedback regarding the relevance and accuracy of the retrieved tattoo designs can be iteratively integrated into the system for continuous system improvement. This feedback can be used to continuously refine the system's semantic understanding and retrieval accuracy, enhancing its utility in forensic applications over time, enhancing the system's ability to understand and interpret the complex semantics of tattoos and tattoo imagery (or other subjects of interest), ensuring that the retrieval process is both accurate and relevant to the needs of forensic experts, in accordance with aspects of the present invention.

Figure 8:
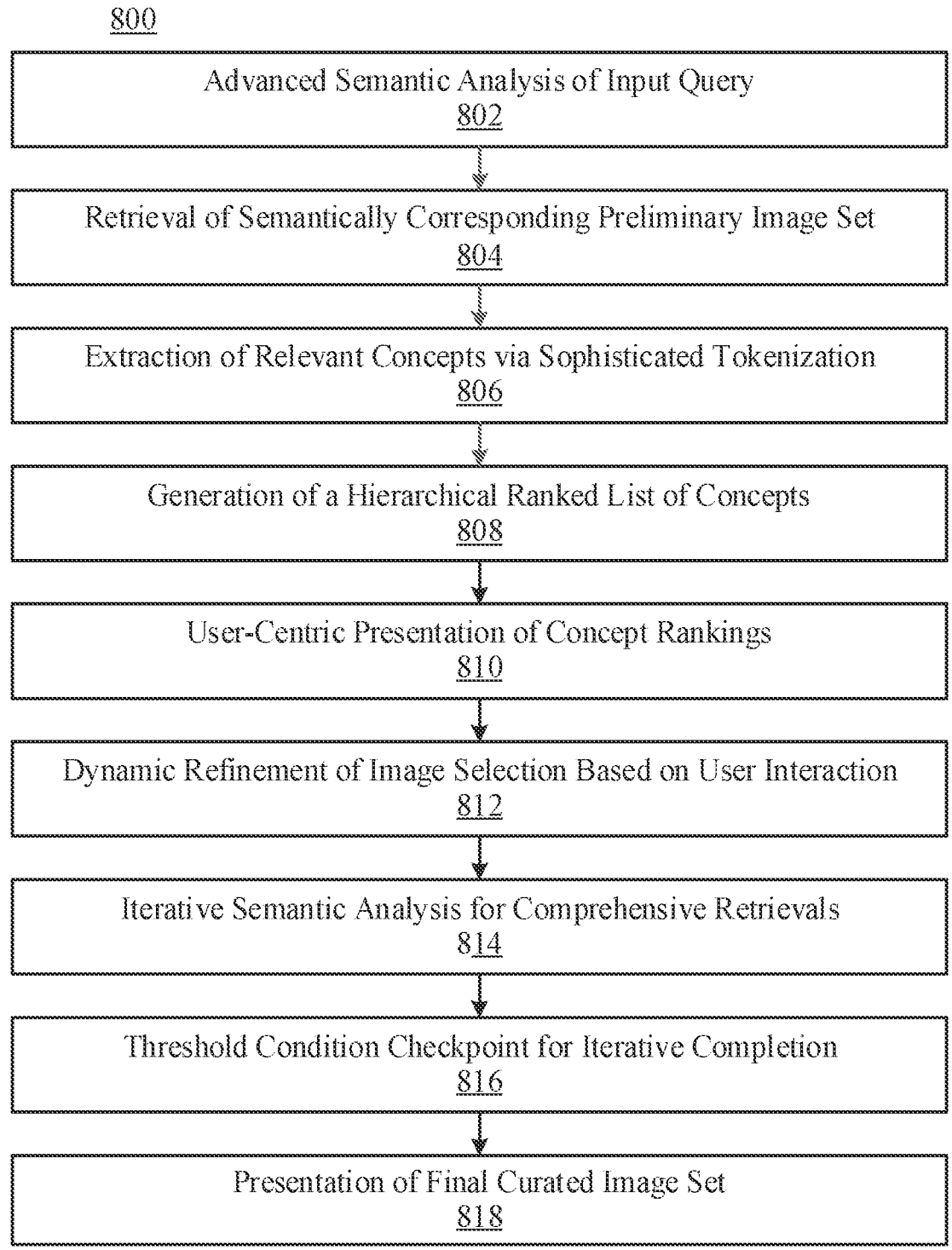
FIG. 8 is a diagram illustratively depicting a method for iterative Artificial Intelligence (AI)-based multimodal semantic analysis and image retrieval responsive to diverse input queries, in accordance with aspects of the present invention.

Referring now to FIG. 8, a diagram showing a method 800 for iterative Artificial Intelligence (AI)-based multimodal semantic analysis and image retrieval responsive to diverse input queries, is illustratively depicted in accordance with embodiments of the present invention. This computer-implemented method 800 can identifies and retrieves semantically similar images from a database, and represents an intricate and systematic approach, incorporating advanced AI semantic analysis, user-interactive systems, and iterative refinement techniques. The method 700 is highly adaptive and user-focused, ensuring that the retrieved images align precisely with the complex semantic intents of the user's query, in accordance with aspects of the present invention.

In various embodiments, in block 802, a robust semantic analysis can be conducted on the user's input query using a sophisticated vision-language model. This model, trained on diverse datasets, interprets the input query in multiple dimensions, understanding the deeper intent and broader context. It considers various linguistic nuances, cultural references, and possible semantic interpretations that could be associated with the query, forming a comprehensive semantic profile that serves as the basis for image retrieval. Block 804 details the process of retrieving a preliminary set of images from a meticulously annotated database. This set can be identified based on the semantic profile established from the input query. The database can contain images tagged with extensive semantic information, facilitating a search that goes beyond superficial visual similarity and into the realm of semantic congruence.

In block 806, each image in the preliminary set can undergo a detailed concept extraction process. A tokenizer, which can incorporate advanced natural language processing capabilities, examines each image and cross-references it with a comprehensive predefined label space. This space includes an extensive array of potential concepts, allowing for the extraction of highly relevant semantic information from each image. Block 808 generates a ranked list of concepts where relevance is determined not only by frequency of occurrence but also by semantic weight, which can be calculated through a weighting mechanism that accounts for the depth of relevance each concept has to the input query. This hierarchical ranking assists in prioritizing concepts for user review, ensuring that the most pertinent concepts are highlighted.

In block 810, a ranked list of relevant concepts can be presented to a user through an interactive and intuitive user interface. The interface may include visualization tools, such as graphs or heatmaps, which help the user in understanding the prevalence and relevance of each concept. The user is encouraged to engage with the list, making informed selections of concepts that best align with their search objectives. Block 812 shows refining of the initial image selection in real-time, based on user interactions. The input query can be dynamically combined with the user's selection of concepts, and the vision-language model can apply this refined criterion in its subsequent searches. Further refinement can be performed in real-time during use by responsiveness to user input, continuously adjusting the image set to better match the user's expectations. In block 814, semantic analyses can be iteratively executed, leveraging additional feedback and refined search criteria to retrieve new sets of images. This loop of analysis and retrieval can be utilized for honing the accuracy and relevance of the search results. The iterative process can also involve machine learning techniques to adapt the vision-language model's parameters for improved future searches based on user interaction patterns, in accordance with aspects of the present invention.

In block 816, evaluation of whether the iterative refinement process has satisfied predetermined threshold conditions can be performed. These conditions can be defined by the quantity of image data retrieved, user satisfaction ratings, a computational determination of semantic alignment quality, or other user-defined criteria or thresholds. The evaluation mechanism ensures the search process is both efficient and aligned with the user's requirements. In block 818, a final curated set of images, which have been semantically refined and verified through iterative user feedback, can be presented to the user. This final presentation may involve sophisticated display algorithms that organize the images in a manner that is most conducive to the user's needs, including for example, being grouped by concept relevance or other criteria specified by the user during the search process, in accordance with aspects of the present invention.

Figure 9:
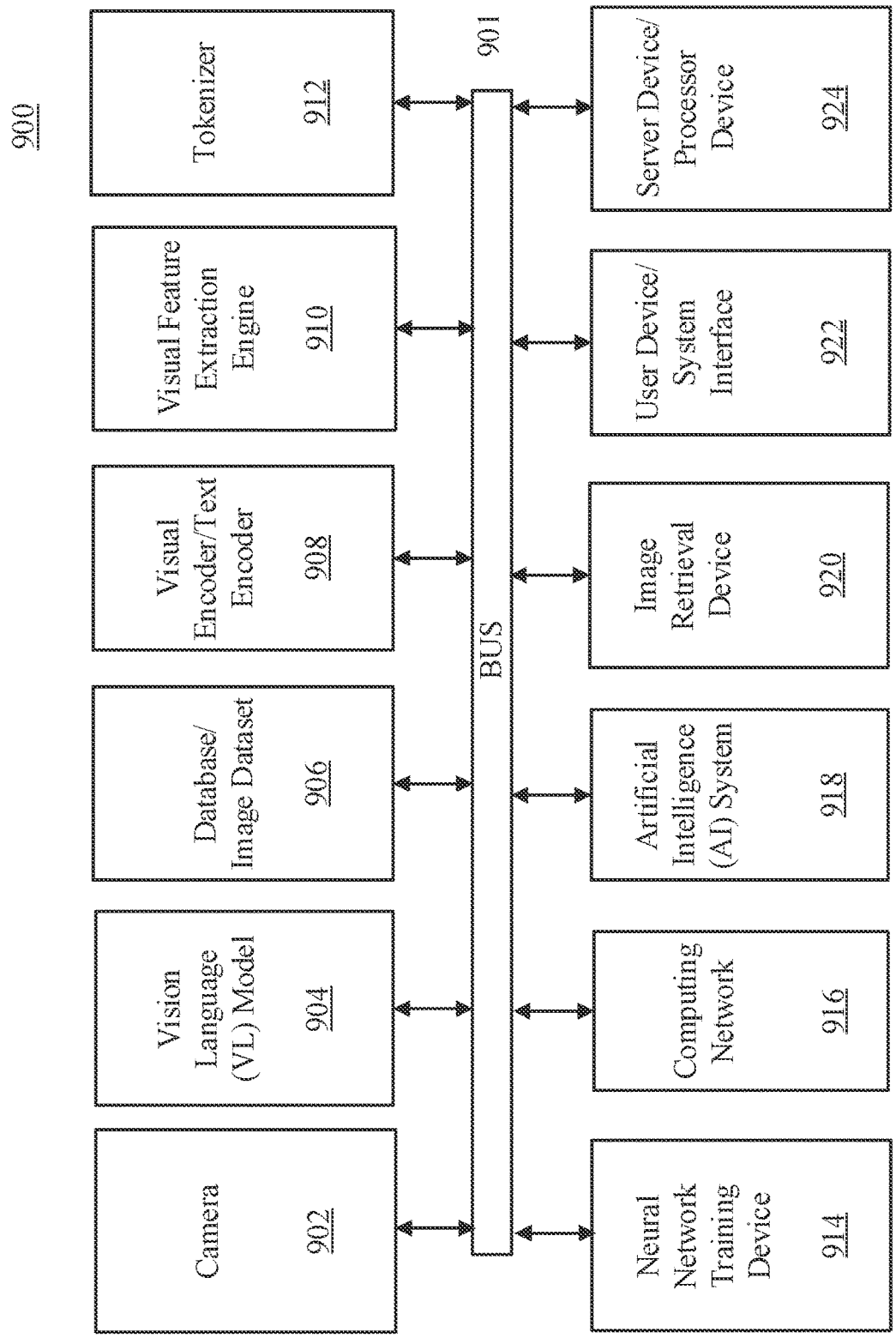
FIG. 9 is a diagram illustratively depicting a system for Artificial Intelligence (AI)-based multimodal semantic analysis and image retrieval responsive to diverse input queries, in accordance with aspects of the present invention.

Referring now to FIG. 9, a diagram showing a system 900 for Artificial Intelligence (AI)-based multimodal semantic analysis and image retrieval responsive to diverse input queries, is illustratively depicted in accordance with embodiments of the present invention.

In various embodiments, a camera 902 can serve as the primary image acquisition device, capturing visual data to be processed by the system. It can be a high-resolution digital camera capable of taking detailed photographs (or any other image capturing device) that the system will use for semantic analysis. The camera 902 can capture nuanced details for the accurate semantic interpretation of visual content. Block 904 refers to the Vision-Language Model, which lies at the core of the system's semantic understanding capabilities. This model, powered by artificial intelligence, can interpret the visual information captured by the camera 902. It processes and analyzes images by understanding the context and extracting semantic data, enabling sophisticated search functionality that transcends traditional keyword matching. The database or image dataset 906 acts as a repository for the system, storing a vast array of images annotated with semantic information. It's structured to support complex queries, allowing for efficient storage and retrieval of images. This dataset can be continually updated and refined to maintain the accuracy and relevance of search results.

In various embodiments, block 908 incorporates both visual and text encoders which can transform raw images and text into encoded features that the system can understand and compare. The visual encoder processes image data, while the text encoder handles textual information, ensuring that the system has a comprehensive understanding of both visual and textual content. The visual feature extraction engine 910 is a dedicated subsystem which can analyze images and extract distinctive features. It can use techniques such as edge detection, pattern recognition, color analysis, etc., to break down images into feature sets that can be used for matching and retrieval. Block 912 features a tokenizer that can process textual data from the encoders and the database to identify discrete concepts within the content. It can operate by breaking down text into tokens, which represent the fundamental units of semantic meaning, for utilization for mapping text to visual content. The BUS 901 represents the communication backbone of the system, enabling data transfer and command flow between the various components. It ensures that the camera, encoders, extraction engine, and tokenizer are all synchronized in their operations, facilitating a seamless workflow.

In block 914, a neural network training device can be utilized for the continuous learning and improvement of the Vision-Language (VL) Model. This sophisticated apparatus can utilize machine learning algorithms, particularly deep learning neural networks, to iteratively train the VL model on a corpus of annotated images and associated textual data. The training device can utilize a combination of supervised, unsupervised, and reinforcement learning techniques to refine the model's ability to accurately interpret and process semantic information.

The training can include feeding the model a multitude of image-text pairs, where the model learns to associate specific visual patterns with their corresponding semantic labels. The device may implement backpropagation algorithms, adjusting the weights within the neural network to minimize the difference between the model's output and the known labels, a process known as error reduction. This iterative training can be conducted over multiple epochs, ensuring the model becomes adept at recognizing a vast array of semantic concepts, from simple object recognition to complex abstract ideas represented in visual form. The training in block 914 can further apply techniques such as transfer learning, where a pre-trained model on a general dataset is fine-tuned with domain-specific data to enhance its performance in specialized tasks. Another aspect of training can involve adversarial training, which introduces perturbations or 'noise' into the training data to improve the model's robustness and ability to generalize from imperfect inputs.

In some embodiments, in addition to the core training functions, block 914 can also engage in hyperparameter tuning to optimize the model's performance. This can include adjusting the learning rate, the number of layers and neurons in the neural network, activation functions, and other model parameters that influence training outcomes. The training device also can validate the model's performance using separate validation datasets to prevent overfitting, ensuring that the model maintains high accuracy when exposed to new, unseen data, in accordance with aspects of the present invention. The computing network 916 can provide the necessary processing power (e.g., cloud) to handle the intensive computational tasks of the system. It also facilitates connectivity between the system components, supporting cloud-based operations and enabling the system to operate at scale.

Block 918 encompasses the Artificial Intelligence system which underpins the semantic analysis and retrieval functions. It integrates machine learning, computer vision, and natural language processing to create a powerful AI core capable of handling complex semantic queries. The image retrieval device 920 can query the image database and retrieve images that are semantically linked to the user's query by, for example, executing search commands and fetching relevant images based on the semantic analysis conducted by the AI system. Block 922 details the user device or system interface, which could be a web portal, mobile app, desktop application etc., serving as the point of interaction between the system and its users. This interface is where users input queries, receive image results, and provide feedback to the system. The server device 924, which can include one or more processor devices, can be utilized to manage the overall operation of the system, hosting the AI components and handling the processing of image and text data. It ensures that all parts of the system work together efficiently, managing resources and optimizing performance for the sophisticated system architecture for a semantic image retrieval process, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment," as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for identifying and retrieving semantically similar images from a database, comprising:

performing a semantic analysis on a multimodal input query utilizing a trained vision language (VL) model to identify semantic concepts associated with the input query by comparing feature vectors of semantic content based on semantic proximity from a common feature space learned by the trained VL model;

retrieving a preliminary set of images from the database based on the semantic concepts identified, the database including images annotated with semantic information;

extracting, for each image in the preliminary set of images, relevant concepts using a tokenizer, the tokenizer comparing each image against a predefined label space to identify the relevant concepts;

training the VL model with continuous learning to refine learned knowledge regarding the semantic analysis on multimodal input queries by:
  generating and presenting to a user a ranked list of the relevant concepts based on occurrence frequency within the preliminary set of images;
  refining the preliminary set of images based on a selection of specific relevant concepts from the ranked list of the relevant concepts by the user by combining the input query with the selection of the specific relevant concepts to generate self-learned representations;
extrapolating generalized concepts that are determined by the VL model as semantically significant to the user having broader concepts than visible concepts from the self-learned representations;
training the VL model using the generalized concepts, the ranked list of relevant concepts and the preliminary set of images to learn visual patterns with corresponding semantic labels; and
iteratively performing additional semantic analysis that includes tattoo association with profiled subcultures for criminal profiling to retrieve additional sets of images semantically similar to the combined input query and the selection of the specific relevant concepts until a threshold condition is met.

2. The method of claim 1, wherein the preliminary set of images is a set of top-k images from the database, with k being a predetermined number and the images being ranked according to a determined semantic similarity to the input query.

3. The method of claim 1, wherein the input query is text, and the semantic analysis includes using a language encoder part of the VL model to find semantically similar images based on textual concepts within the predefined label space.

4. The method of claim 1, wherein the input query is an image, and the semantic analysis includes using a visual encoder part of the VL model to map visual concepts of the input image to textual concepts within the predefined label space.

5. The method of claim 1, further comprising refining the predefined label space prior to extracting the relevant concepts by removing redundant and non-discriminative labels to enhance accuracy of concept extraction.

6. The method of claim 1, further comprising employing a feedback loop to iteratively refine a search for the input query based on a selection of additional relevant concepts by the user.

7. The method of claim 1, wherein the selection of relevant concepts by the user includes utilizing a drag-and-drop feature of a user interface to enable the user to combine multiple concepts in a specified order for a further refined search.

8. A system for identifying and retrieving semantically similar images from a database, comprising:
  a processor;
  a memory storing instructions that, when executed by the processor, cause the system to:
  perform a semantic analysis on a multimodal input query using a trained vision language (VL) model to identify semantic concepts associated with the input query by comparing feature vectors of semantic content based on semantic proximity from a common feature space learned by the trained VL model;
  retrieve a preliminary set of images from the database based on the identified semantic concepts, the database including images annotated with semantic information;
  extract relevant concepts for each image in the preliminary set using a tokenizer that compares each image against a predefined label space;
  training the VL model with continuous learning to refine learned knowledge regarding the semantic analysis on multimodal input queries by:
    generate and present to a user a ranked list of the relevant concepts based on occurrence frequency within the preliminary set of images;
    refine the preliminary set of images based on a selection of specific relevant concepts from the ranked list by the user by combining the input query with the selection to generate self-learned representations;
    extrapolate generalized concepts that are determined by the VL model as semantically significant to the user having broader concepts than visible concepts from the self-learned representations;
    train the VL model using the generalized concepts, the ranked list of relevant concepts and the preliminary set of images to learn visual patterns with corresponding semantic labels; and
    iteratively perform additional semantic analysis that includes tattoo association with profiled subcultures for criminal profiling to retrieve additional sets of images semantically similar to the combined input query and the selection of the specific relevant concepts until a threshold condition is met.

9. The system of claim 8, wherein the preliminary set of images comprises a set of top-k images from the database, with k being a predetermined number, and the images are ranked according to determined semantic similarity to the input query.

10. The system of claim 8, wherein the input query is text, and the semantic analysis includes processing by a language encoder component of the VL model to find semantically similar images based on textual concepts within the predefined label space.

11. The system of claim 8, wherein the input query is an image, and the semantic analysis includes processing by a visual encoder component of the VL model to map visual concepts of the input image to textual concepts within the predefined label space.

12. The system of claim 8, wherein the instructions further cause the system to refine the predefined label space by removing redundant and non-discriminative labels to enhance accuracy of concept extraction.

13. The system of claim 8, wherein the instructions further cause the system to employ a feedback loop to iteratively refine a search for the input query based on the selection of additional relevant concepts by the user.

14. The system of claim 8, further comprising a drag-and-drop feature of a user interface, enabling the user to combine multiple concepts in a specified order for a further refined search.

* * * * *